United States Patent [19]

Lindstrom

[11] 4,056,684

[45] Nov. 1, 1977

[54] SURVEILLANCE SYSTEM

[75] Inventor: Arne David Lindstrom, Jonkoping, Sweden

[73] Assignee: Saab-Scania AB, Jonkoping, Sweden

[21] Appl. No.: 635,228

[22] Filed: Nov. 25, 1975

[30] Foreign Application Priority Data

Nov. 26, 1974 Sweden .............................. 7414814

[51] Int. Cl.² ............................................ H04M 11/04
[52] U.S. Cl. ..................................... 179/5 R; 340/413
[58] Field of Search .................. 179/5 R, 2 A, 15 AT, 179/15 BY, 15 BL, 18 FF, 18 FG; 340/309.4, 309.5, 409, 413

[56] References Cited

U.S. PATENT DOCUMENTS

| | | | |
|---|---|---|---|
| 3,073,907 | 1/1963 | Alterman et al. ................ | 179/18 FG |
| 3,347,992 | 10/1967 | Von Sanden et al. ........... | 179/15 AT |
| 3,576,399 | 4/1971 | Schweitzer et al ............. | 179/18 FG |
| 3,715,515 | 2/1973 | Stirling et al. ................... | 179/18 FF |
| 3,882,278 | 5/1975 | Coll ..................................... | 179/5 R |
| 3,894,191 | 7/1975 | Sassa ................................ | 179/18 FG |

Primary Examiner—William C. Cooper
Assistant Examiner—Gerald L. Brigance
Attorney, Agent, or Firm—Brumbaugh, Graves, Donohue & Raymond

[57] ABSTRACT

A surveillance system comprises a central unit connected, by the intermediary of a communication channel, to a plurality of local terminal units in order to receive information from these units concerning changes of status in sensors connected to the terminal units. Each terminal unit comprises a transfer blocking register with a memory cell for each sensor in at least one group of the sensors connected to the terminal unit. These memory cells have two states and are switchable between these states by control information transferred from the central unit. Moreover, a sensing device is provided for achieving, on a change of status in any one of the sensors of the group, transfer of information on such change to the central unit only when the corresponding memory cell in the transfer blocking register is in one of its two states.

15 Claims, 9 Drawing Figures

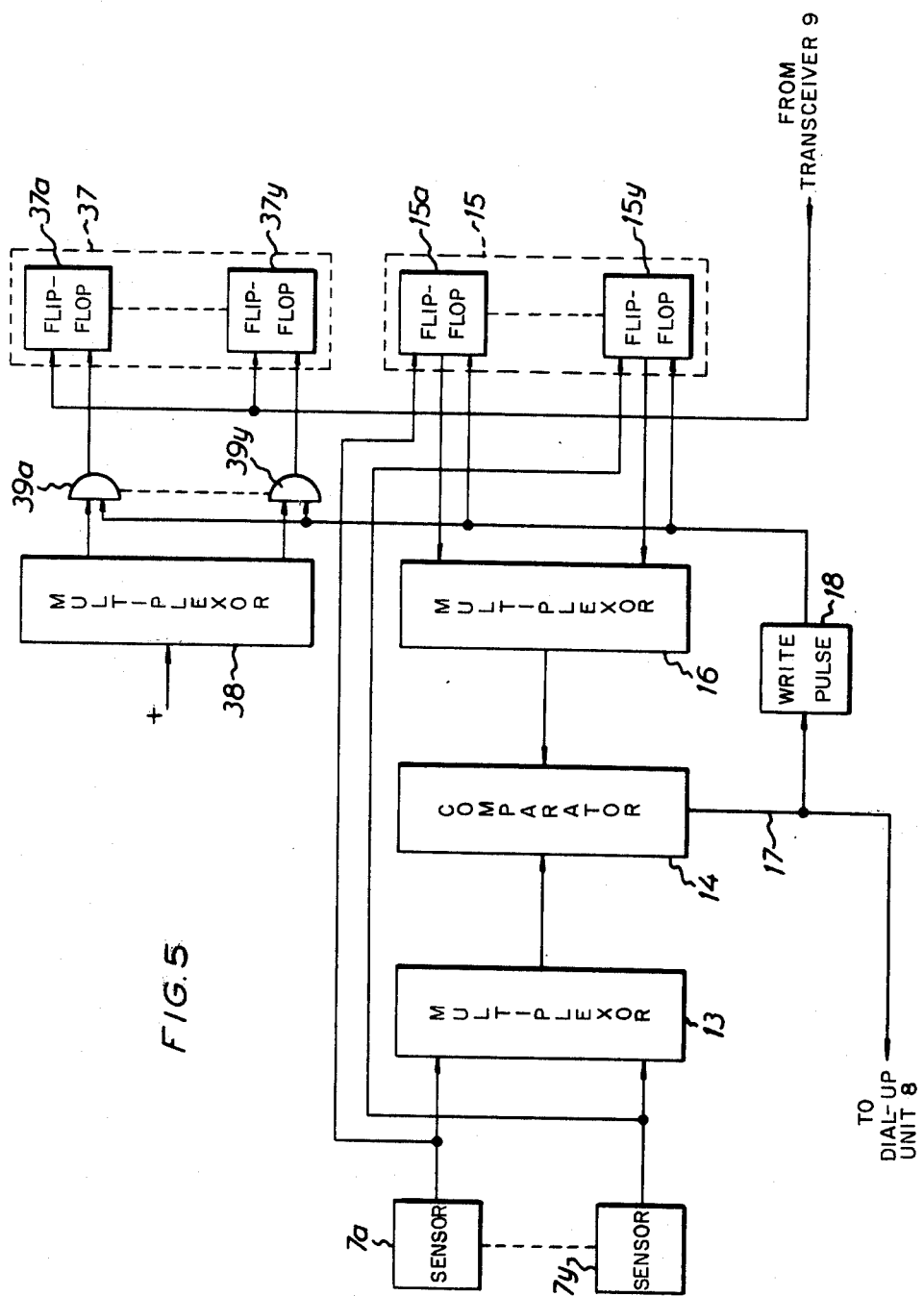

SURVEILLANCE SYSTEM

The present invention relates to a surveillance system including a central unit which is connected to a plurality of local terminal units by the intermediary of a communication channel in order to receive information from the local terminal units concerning changes of status of the sensors connected to the terminal units.

Such systems are known and make possible an economical surveillance of a plurality of local surveillance areas which each have a terminal unit and sensors connected thereto. These sensors are normally of two types; namely, the type exemplified by fire detectors which are to be able constantly to provide information via the terminal unit to the central unit concerning a change of status which requires the triggering of an alarm; and of the type exemplified by various burglar alarms whose changes of status are to trigger an alarm only during certain times, for example, non-working hours.

The sensors of the last-mentioned type are normally energizable and de-energizable by manual on-and-off-switching within each separate surveillance area, which entails a risk for false alarm occasioned by an omission to switch off sensors, a risk for no alarm at all because of an omission to switch on the sensors and a risk that unauthorized persons switch off sensors which have been switched on.

An aspect of the present invention is therefore to improve a surveillance system of the type indicated by way of introduction to such an extent that the above-described risks are substantially eliminated.

Systems like those described above often utilize permanent lines, for example, fixedly coupled lines in the public telephone network, as a communication channel between the central unit and the terminal units. However, information transfer systems with a central unit and a plurality of terminal units are previously known, such systems utilizing the public telephone network only on those occasions when information is to be transferred. In this case, each terminal unit can be provided with an automatic dial-up unit which, on the occurrence of a change of status in any sensor, automatically establishes communication with the central unit via the telephone network. This eliminates the risk that a disruption in a single permanent communication line between the terminal unit and the central unit will put an entire local surveillance area out of action, while avoiding the expensive solution to this problem of using several permanent communication lines from each terminal unit to the central unit.

Another aspect of the present invention is to realize a surveillance system of the type indicated by way of introduction, the system utilizing an automatic dial-up unit at each terminal unit and being so designed that the operability of the communication lines between the terminal units and the central unit is checked by repetitive establishment of these communication lines.

When the surveillance system is designed such that the central unit can only after a certain time-lag receive information concerning a change of status of a sensor, for example, when the communication from the terminal unit to the central unit must first be established by means of an automatic dial-up unit, the sensor may once again have changed is status at the delayed information transfer moment, with the result that the information concerning the change of status is lost.

A further aspect of the present invention is to improve a surveillance system of the type indicated by way of introduction such that no loss of information occurs because of temporary changes of status.

According to the invention, each terminal unit includes a transfer blocking register with a memory cell for each sensor in at least one group of the sensors associated with the terminal unit, the memory cells having two states and being switchable between these states by control information transferred from the central unit, and a sensing device for achieving, on a change of status of any one of the sensors in the group, transfer of information of such change to the central unit only when the corresponding memory cell in the transfer blocking register is in one of its two states.

The nature of the present invention and its aspects will be more fully understood from the following description of the accompanying drawings, and discussion relating thereto. In the accompanying drawings:

FIG. 5 is a block diagram of an information loss prevention device included in the terminal units in one embodiment of the surveillance system according to the present invention.

Figure 1:
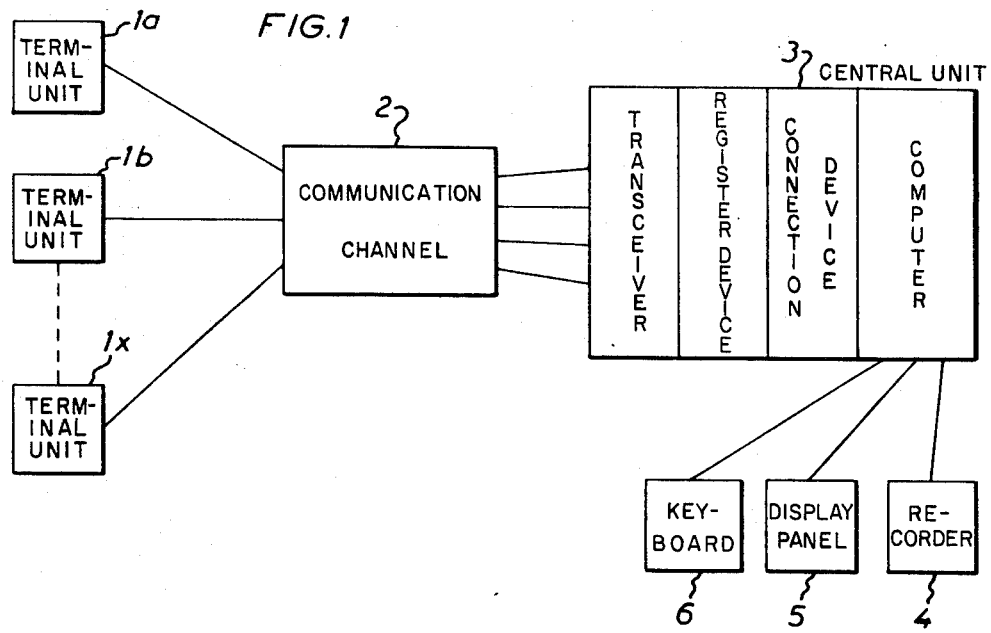
FIG. 1 is a block diagram of a surveillance system of the type contemplated in the present invention.

The surveillance system illustrated schematically in FIG. 1 includes a number of terminal units 1a, 1b, ... 1x which are connected to a central unit 3 by the intermediary of a communication channel 2. As is illustrated in FIG. 1, the central unit 3 can include, as seen from the communication channel 2, a transceiver for transmitting information to the terminal units and receiving information from them, a register device for temporary storage of the transmitted and/or received information, a computer and a connection device between the register device and the computer. The transceiver consists of a number of filters with operational amplifiers, for example Motorola MC 1458. Also included in a series/parallel/parallel/series converter, for example Texas Instruments TMS 6011 with various logic units constructed from logic circuits from the 74 series. In the register device is included a microcomputer of the type Intel 8080 with a read only memory (e.g. Intel 702A) and a random access memory (e.g. Intel 4002-1) and various logic circuits from the 74 series. The connection device consists of logic circuits from the 74 series. The computer is a minicomputer, for example Datasaab D15, with a disk memory, for example Datasaab 4801. A recorder 4 e.g. a Datasaab 4553, a display panel 5 e.g., a Datasaab 4405 and a keyboard 6 e.g., a Datasaab 4626 can be connected to the computer in a currently employed way.

This surveillance system is intended to operate in the following manner. Information sent from the terminal units 1a-1x via the communication channel 2 is received by the transceiver of the central unit 3 and stored in its register device which then seeks contact with the computer via the connecting device for transferring the information temporarily stored in the register device. Once the register device has established contact with the computer and the information temporarily stored in the register device has been transferred to the computer, this information is processed in the computer in accordance with a program stored therein. As a result of the information processing in the computer, reply information is sent back to the terminal unit in question via the communication channel.

Figure 2:
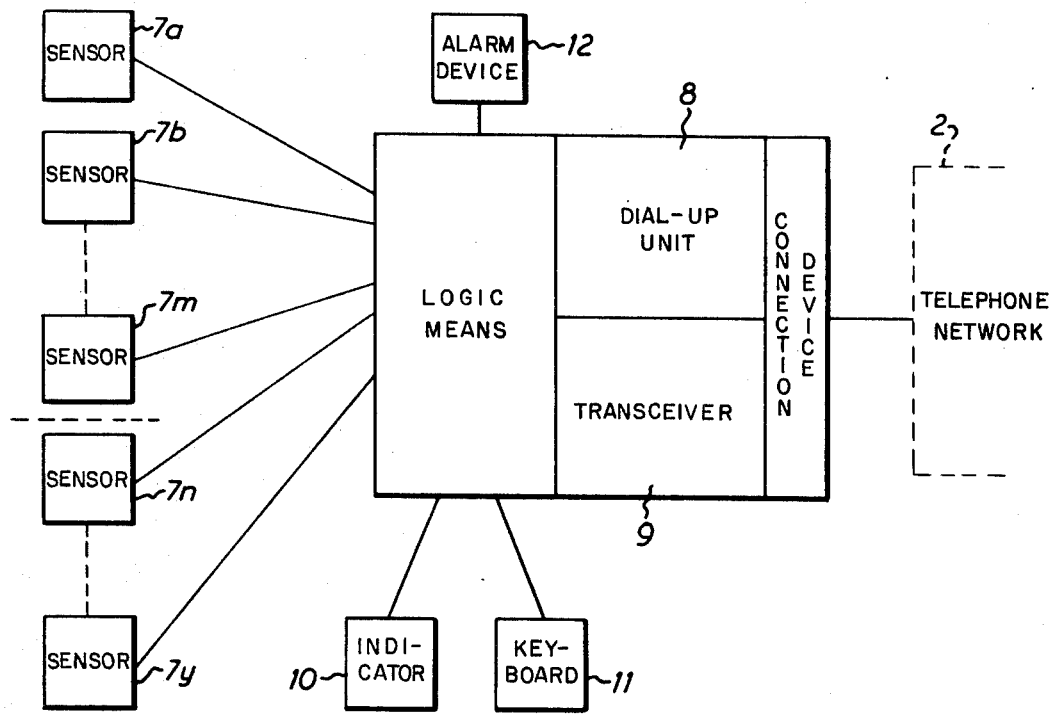
FIG. 2 is a block diagram of an embodiment of a terminal unit in a surveillance system according to the present invention.

In the embodiment illustrated in FIG. 2, each one of the terminal units $1a-1x$ includes a plurality of sensors $7a-7b...7m, 7n, ... 7y$ connected to a logic means to which are also connected an automatic dial-up unit 8, a transceiver 9, an indicator 10 for indicating, for example, reply information received from the central unit, and a keyboard 11 for communication with the computer of the central unit 3. The automatic dial-up unit 8 is arranged, on instruction from the logic means, to establish a communication, such as the communication channel 2, between the transceiver 9 of the terminal unit and the transceiver of the central unit 3, via a connection device and the telephone network.

Possible constructions of the automatic dial-up unit 8, the transceiver 9, the connection device, the indicator 10 and the keyboard 11 of the terminal unit are well-known to persons skilled in the art and shall not, therefore, be described in greater detail in this specification. However, it might be mentioned that the logic means consists of a microcomputer of the type Intel MCS4 with a read only memory (eg Intel 1702A) and a random access memory (eg Intel 4002-1) and various circuits from the 74 series. The automatic dial-up unit 8 consists of logic circuits from the 74 series and two relays (eg Clare MRME). The transceiver 9 is constructed in the same way as the transceiver in the central unit 3. The indicator 10 may, for instance, be a figure indicator of the type Fuji 3015F and the keyboard 11 of the type Eklov HEC-H-3/A. The connection device consists of a transformer, a relay (eg Siemens V23154) and cable and a telephone jack plug for connection to the telephone network. A number of different prior art detectors may be utilized as the sensors $7a-7y$, for example micro-wave detectors of the type Securitas HVD2, these prior art detectors displaying two statuses which can be signalled to the logic means by electric signal. The logic means is designed such that on a change of status in any one of the sensors, the automatic dial-up unit 8 is started for establishing communication between the transceiver 9 of the terminal unit and the transceiver of the central unit 3. When communication is established (which is confirmed by a reply signal from the transceiver of the central unit 3 to the logic means of the terminal unit via its transceiver) the logic means transfers information concerning the status of all of the sensors via the transceiver 9 to the transceiver of the central unit 3 and its register device for temporary storage of the information. The communication is maintained until such time as the information temporarily stored in the register device has been transferred to the computer, processed by the computer and the reply information produced as a consequence of this processing transferred back to the logic means of the terminal unit via the register device for temporary information storage and the transceiver, the communication channel 2 of the telephone network and the transceiver 9 of the terminal unit. This reply information to the terminal unit normally contains instructions for the release of the connection and may contain instructions for the activation of an alarm device 12 connected to the logic means in cases when the change of status initiating the information transfer is of such a nature as to require the triggering of an alarm.

Figure 3:
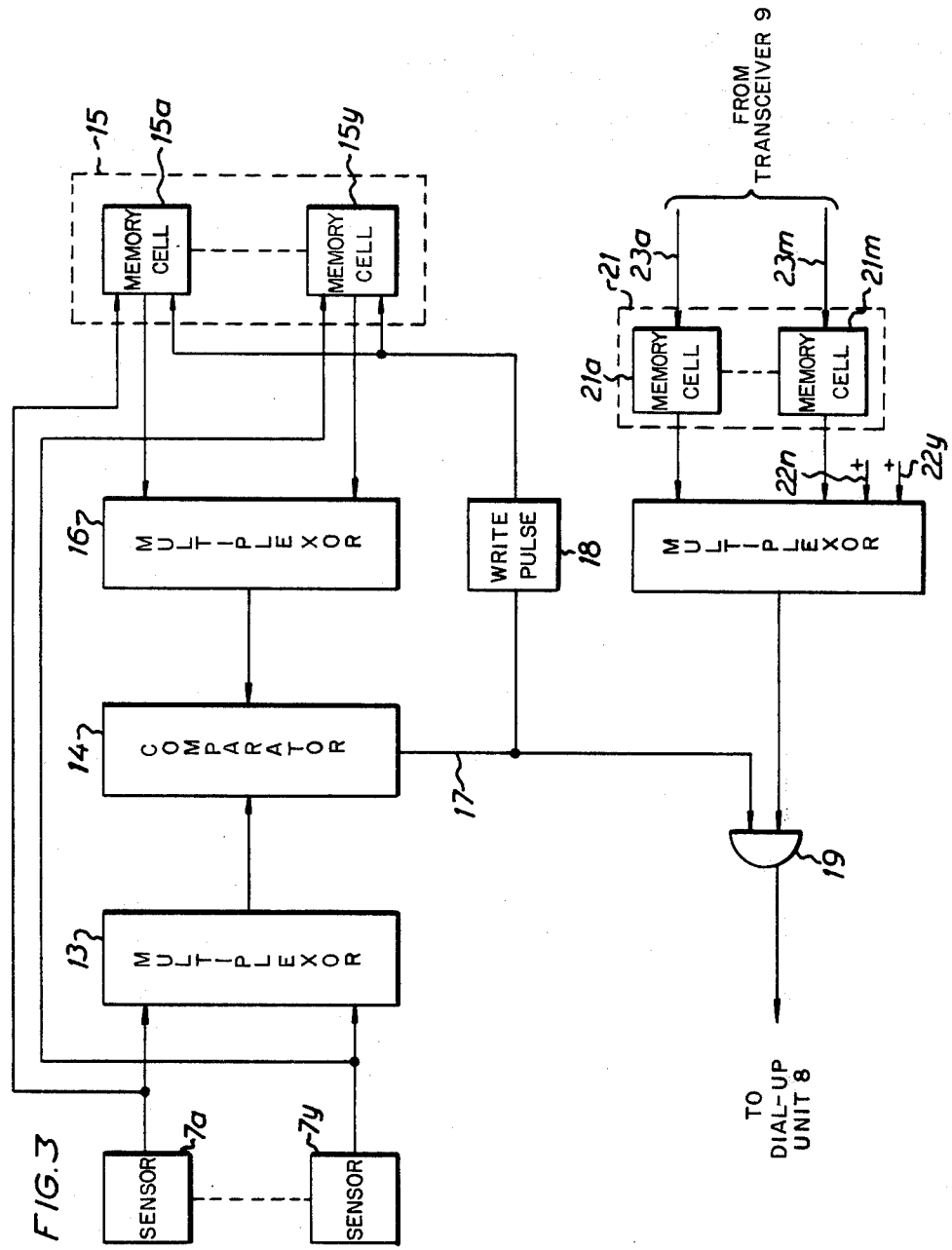
FIG. 3 is a block diagram of an arrangement according to the present invention of a part of each terminal unit of FIG. 2.

The reader is not referred to FIG. 3 which shows a part of the logic means of FIG. 2 for transferring information concerning the changes of status of the sensors $7a-7y$ to the central unit 3 by the automatic dial-up unit 8 and transceiver 9 of the terminal unit. The sensors $7a-7y$ shown in FIG. 3 are divided into a first group $7n-7y$ in which it must be constantly possible for information on the changes of status of the sensors to be transferred to the central unit 3; and a second group $7a-7m$ in which the changes of status of the sensors are only of interest to the central unit 3 during certain times, for example, non-working hours. All of the sensors $7a-7y$ may be coupled by means of a first multiplexor 13 one at a time to a comparator 14. The multiplexor 13 may consist of logic circuits from the 74 series. Furthermore, the sensors $7a-7y$ are each coupled to a memory cell $15a-15y$ in a status register 15, the memory cells being connectable one at a time to a comparator 14 by means of a second multiplexor 16 which operates in synchronism with the first multiplexor 13. Thus, the comparator is arranged to compare the current status of each sensor $7a-7y$ with a status for that sensor previously registered in the corresponding memory cell $15a-15y$ in the status register 15. This comparison is effected cyclically and at the occurrence of a difference, the comparator 14 emits a signal on a line 17 which is connected to an element 18 for the emission of a writing pulse to all of the memory cells $15a-15y$ in the status register 15. Consequently, the current status of the sensors $7a-7y$ will thus be written into the memory cells $15a-15y$. The signal emitted on the line 17 is also impressed on an input to an AND gate 19 whose other input is connected to a third multiplexor 20 which operates in synchronism with the first and second multiplexors 13, 16 for connecting, in sequence, a number of memory cells $21a-21m$ in a transfer blocking register 21 corresponding to the number of sensors in the second group $7a-7m$ to the AND gate 19. The multiplexor 20 also has a number of inputs $22n-22y$ which correspond to the number of sensors in the first group $7n-7y$ and are constantly impressed with a voltage. The transfer blocking register 21 may be set by means of control information from the central unit 3, this control information being received by the transceiver 9 and converted by circuits (not shown) in the logic means into control signals which are impressed on the set inputs $23a-23m$ to the memory cells $21a-21m$ of the transfer blocking register 21. The output of the AND gate 19 is connected to the automatic dial-up unit 8, for which reason the signal produced on the line 17, on detection by the comparator 14 of a change of status in one sensor in the second group $7a-7m$, is conveyed through the AND gate 19 to the automatic dial-up unit 8 in dependence upon the state set by the central unit 3 in the corresponding memory cell $21a-21m$ in the transfer blocking register 21, whereas, in the event of a detected change of status in any one of the sensors $7n-7y$, the signal occurring on the line 17 will always be conveyed through the AND gate 19 to the automatic dial-up unit 8.

Like the register 21, the register 15 is a random access memory, for example Intel 4002-1. The blocks 14, 16 and 18-20 can consist of discrete units but their functions may also be carried out by the microcomputer which forms the logic means of the terminal unit.

In an alternative embodiment, the AND gate 19 may be dispensed with, the line 17 may be connected directly to the automatic dial-up unit 8 and the output of the multiplexor 20 may be connected to an inhibiting input to the comparator 14, this only carrying out its comparison for the sensors 7n–7y and for those of the sensors 7a–7m which, in the corresponding memory cells 21a–21m in the transfer blocking register 21, are set in a status which permits the comparison.

The automatic dial-up unit 8 is arranged, on the supply of the signal on the line 17, automatically to establish communication via the telephone network 2 between the transceiver 9 of the terminal unit and the transceiver of the central unit 3. When this communication is established, the logic means will cause the transceiver 9 to transmit information identifying the terminal unit in question, together with information corresponding to the current sensor statuses registered in the memory cells 15a–15y of the status register 15.

Figure 4:
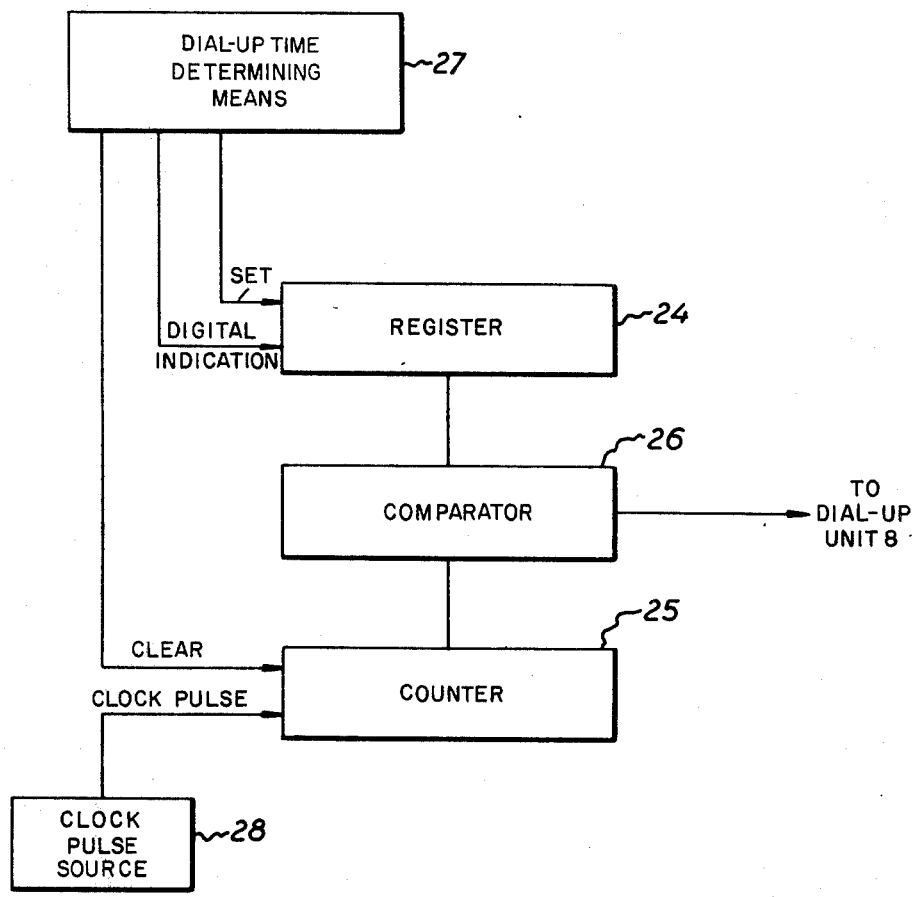
FIGS. 4, 4a, 4b, 4c and 4d are block diagrams of a communication checking device which is included in the terminal units in one embodiment of the surveillance system according to the present invention.

The apparatus shown in FIG. 4 for checking the connection between a terminal unit 1a–1x and the central unit 3 includes a register 24 for the dial-up time and a counter 25 for running time, which are both connected via a comparator 26 to the automatic dial-up unit 8. Both the register 24 and the counter 25 are, furthermore, connected to means 27 for determining the dial-up time, this means being arranged to set data displaying a digital indication in the register 24 and to clear the counter 25 simultaneously. The counter 25 may be fed with count pulses from a clock pulse source 28 so that on correspondence between the contents in the register 24 and in the counter 25, the comparator 26 emits the signal to the automatic dial-up unit 8 for establishment of communication with the central unit 3. As a result, recurring checks are achieved of the connection between the terminal units 1a–1x and the central units 3, the interval between these checks being determined by the means 27 for determining the dial-up time. This means 27 is suitably arranged to feed data displaying the new dial-up time into the register 24 after each establishment of communication, regardless of whether the establishment of the communication was triggered by the comparator 26 or by a change of status in a sensor.

In an alternative embodiment, the comparator 26 and the counter 25 may be dispensed with and the register 24 may be a counter which, after the feeding in by the means 27 of data indicating the new dial-up time, is driven by the clock pulse source 28 to count to zero and then energize the automatic dial-up unit 8.

Various embodiments of the means 27 for determining the dial-up time are possible and a few such embodiments are illustrated in FIGS. 4a–4d.

Figure 4A:
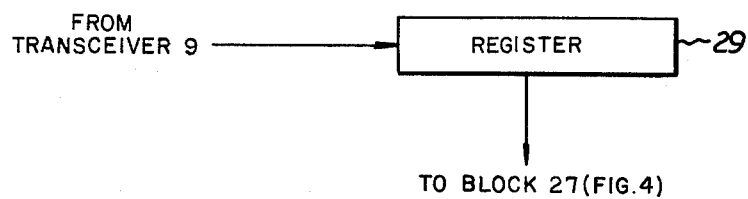

In the embodiment illustrated in FIG. 4a, the point in time for the next establishment of communication is determined by the central unit 3 on each establishment of communication between the terminal units 1a–1x and the central unit 3 in that information on the next establishment of communication is transferred to the terminal unit in question in the reply given by the central unit to the terminal unit. To this end, each terminal unit has a register 29 in which the information of the central unit 3 concerning the next dial-up time is registered via the transceiver 9. This information contains partly an order for the setting of the next dial-up time in the dial-up time register 24 and partly data displaying the digital indication of the next dial-up time.

Figure 4B:
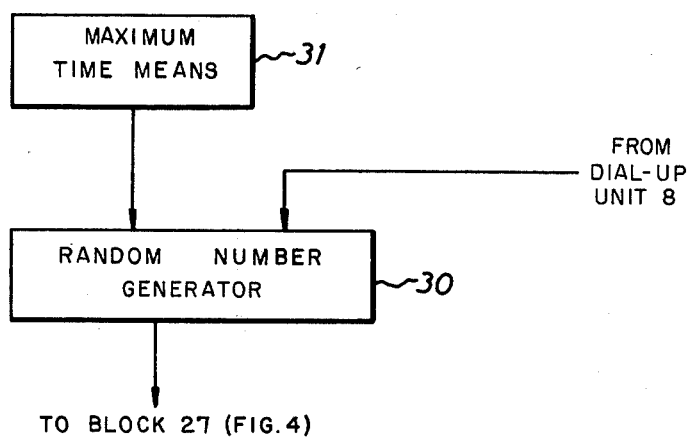

In the embodiment illustrated in FIG. 4b, the means 27 for determining the next dial-up time has a random number generator 30 provided in the terminal unit and controlled by a means 31 for maximum time, so that the random number generator produces different digital indications with a certain distribution within the maximum time. As is intimated by means of a line 32 the random number generator 30 is controlled by the automatic dial-up unit 8 so as to produce, on each energization of the dial-up unit 8 establishment of the communication to the central unit 3, the above-mentioned digital indication which is entered in the dial-up time register 24 at the same time as the counter 25 is cleared.

Figure 4C:
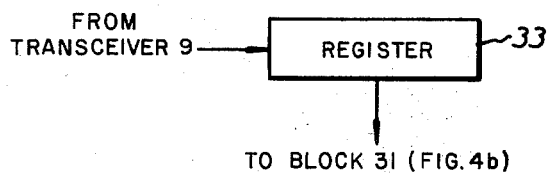
Figure 4D:
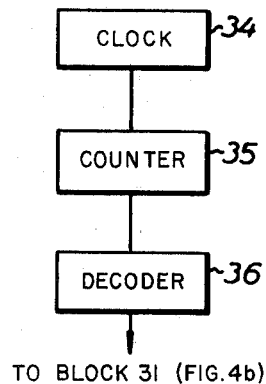

The maximum time in FIG. 4b can either be determined in the manner illustrated in FIG. 4c or be determined in the manner illustrated in FIG. 4d. According to FIG. 4c, the maximum time is determined centrally in that information determining the maximum time and taken from a response from the central unit 3 is entered, via the transceiver 9 in a register 33 in the terminal unit, the contents of the register 33 guiding the maximum time value of the random number generator 30. According to FIG. 4d, the terminal unit independently determines the maximum time with the assistance of a clock 34, a counter 35 and a decoder 36.

The above-described apparatuses for checking communication between the terminal units 1a–1x and the central unit 3 ensure primarily the discovery of faults in the communication and also the discovery of faults in for example the dial-up unit 8 and the transceiver 9. For each one of the above-described embodiments of the checking apparatus, information is stored in the central unit 3 on the latest time by which the different terminal units 1a–1x are to establish communication with the central unit. Consequently, the central unit 3 can be arranged to trigger an alarm centrally if a terminal unit has not established communication with the central unit at the established point in time. The intervals between the communication checks can, furthermore, be varied, in particular in the preferred embodiment according to FIG. 4 and 4a, in dependence upon the level of reliability with which communication between the terminal units 1a–1x and the central unit 3 is to be established on the occurrence of a change of status in any one of the sensors 7a–7y, which has a favourable influence on the economic aspect of the art and goes a long way towards effective elimination of the risks of sabotage.

The functions of the register 24, the counter 25, the comparator 26, the means 27, the register 29, the random number generator 30, the means 31, the register 33, the counter 35 and the decoder 36 are carried out by the microcomputer.

The loss of information prevention device according to the present invention illustrated in FIG. 5 is provided with the blocks 7a–7y, 8, 9, 13–16 and 18, and can, although this is not shown, be provided with the blocks 19–21 jointly with corresponding blocks in the terminal unit according to FIG. 3. This loss of information prevention device is intended for surveillance systems in which the central unit 3 can only after a certain time-lag receive the information registered in the status register, information which thus, at an instantaneous change back and forth of the status of a sensor on the information transfer to the central unit, does not display anything which would single out the sensor whose change brought about the transfer. In order to remedy this shortcoming, a change register 37, according to FIG. 5, is provided with a number of bistable memory cells or flip-flops 37a–37y corresponding to the number of sensors 7a–7y. A multiplexor 38 is arranged to operate in synchronism with the first and the second multiplexors 13, 16 for supplying, one at a time, a signal to a plurality of AND gates 39a–39y whose outputs are each connected to the set input of their respective flip-flops 37a–37y and whose second inputs are jointly connected to the output of the write pulse element 18. The reset inputs of the flip-flops 37a–37y are jointly connected to the transceiver 9 which is arranged to reset all of the flip-flops 37a–37y only after the information stored in the status register 15 and the information stored in the change register 37 have been transferred to the central unit 3.

As in FIG. 3, a signal is produced on the line 17 on a change of status in any of the sensors 7a–7y, the signal being converted, by the intermediary of the write-pulse element 18, to a write-pulse which is applied to the memory cells 15a–15y for registration of the current status of the sensors 7a–7y and is applied to the second inputs of the AND gates 39a–39y. Then, that one of the gates 39a–39y which corresponds to the sensor displaying the change of status is opened by means of the multiplexor 38 so that the corresponding one of the flip-flops 37a–37y is set. If, during the time which elapses between the energization of the automatic dial-up unit 8 as a consequence of the change of status and the establishment of communication to the central unit 3, the status of the above-mentioned sensor is once again changed, this change will be registered in the status register 15 which thereby contains the same information as before the first change of status, whereas the corresponding flip-flop in the register 37 is not affected, since this flip-flop was already set on the occasion of the first change of status. When the information in the registers 15 and 37 is then transferred to the central unit 3, this central unit receives both information which singles out the sensor which caused the transfer and information on the current status of this sensor as well as the current status of the remaining sensors.

It will be appreciated that the above-described embodiments of the present invention can be modified in a number of ways within the spirit and scope of the appended claims.

What I claim and desire to secure by Letters Patent is:

1. In a surveillance system which comprises a central unit connected, by the intermediary of a communication channel to a plurality of local terminal units in order to receive information from these units concerning changes of status in sensors connected to said terminal units, the improvement wherein said terminal unit comprises:
   a. a transfer blocking register with a memory cell for each sensor in at least one group of the sensors connected to said terminal unit, said memory cells having two states and being switchable between these states by control information transferred from said central unit; and
   a sensing device for achieving, on a change of status in any one of the sensors of the group, transfer of information on such change to the central unit only when the corresponding memory cell in the transfer blocking register is in one of its two states.

2. The system of claim 1, wherein said sensing device is arranged to sense changes of status in the sensors and, on sensing a change of status in a sensor, to emit a signal indicating such change to a gate circuit controlled by said transfer blocking register in dependence of the memory cell corresponding to this sensor, said gate circuit being controlled such that the signal passes said gate circuit for achieving the information transfer only when said memory cell is in said one state.

3. The system of claim 1, wherein said detection device is arranged to detect changes of status only in those sensors in the first group of said at least one groups whose corresponding memory cells in the transfer blocking register are in said one state.

4. The system of claim 2, wherein said sensing device includes;
   a. a status register with a memory cell for each sensor connected to the terminal unit for storage of information on the status of said sensors; and
   b. a comparator for establishing a change of status in a sensor by comparison of the current status of said sensor with status information stored in the corresponding memory cell in said status register and for changing, on the establishment of a change of status, the stored status information into agreement with the current status of said sensor.

5. The system of claim 4, further comprising a first and a second multiplexor for cyclically connecting, one at a time, each pair comprising a sensor and a corresponding memory cell in the status register to said comparator.

6. The system of claim 4, wherein the each sensor is connected to a corresponding memory cell in said status register for entering information corresponding to the status in the sensor into said memory cell on a change in the status of such sensor, as said change is determined by said comparator.

7. The system of claim 2, further comprising a first and a second multiplexor for cyclically connecting, one at a time, each pair comprising a sensor and a corresponding memory cell in the status register to said comparator, and a third multiplexor operating in synchronism with said first and said second multiplexors for connecting, one at a time, the memory cells of said transfer blocking register to said gate circuit.

8. The system of claim 3, further comprising a first and a second multiplexor for cyclically connecting, one at a time, each pair comprising a sensor and a corresponding memory cell in the status register to said comparator, and a third multiplexor operating in synchronism with said first and said second multiplexors for connecting, one at a time, the memory cells of said transfer blocking register to an inhibiting input to said comparator.

9. A surveillance system comprising a central unit which is connected, by the intermediary of the telephone network, to a plurality of local terminal units for receiving from such terminal units information on changes of status in sensors connected to said terminal units, each terminal unit having an automatic dial-up unit for establishing communication between said terminal unit and said central unit via the telephone network for transmission of said information, wherein each terminal unit includes a register for establishing communication between such terminal unit and said central unit, for the purposes of checking, by energization of said automatic dial-up unit at a point in time determined by data stored in said register, each such terminal unit further including means for entering data into the register determining a new point in time after each establishment of the communication.

10. The system of claim 9, wherein said register consists of a counter which, after a data entering by a clock pulse source, is caused to count to zero and thereafter energize said automatic dial-up unit.

11. The system of claim 9, further comprising a counter fed by a clock pulse source, and a comparator for comparing the contents of said register and said counter and for energizing said automatic dial-up unit when said contents correspond, said data entering means also clearing said counter on entering data in said register.

12. The system of claim 9, wherein said data entering means is arranged to receive the data determining a new point in time from said central unit each time communication is established.

13. The system of claim 9, wherein said data entering means includes a random number generator which is controlled to produce a number for entering as the new data in said register on each energization of said automatic dial-up unit.

14. The system of claim 13, wherein the numbers produced by said random number generator have a maximum value determined by said central unit.

15. The system of claim 13, wherein the numbers produced by said random number generator have a maximum value determined by the decoding, by a decoder, of the contents of a clock controlled counter.

* * * * *